(12) United States Patent
Miller et al.

(10) Patent No.: US 9,638,921 B2
(45) Date of Patent: May 2, 2017

(54) STRAP SYSTEM FOR HEAD-MOUNTED DISPLAYS

(71) Applicant: OCULUS VR, LLC, Menlo Park, CA (US)

(72) Inventors: Robin Michael Miller, Redmond, WA (US); Jared I. Drinkwater, Auburn, WA (US); Lesley Ribble Magrath, Seattle, WA (US); Peter Wesley Bristol, Seattle, WA (US); Joseph Patrick Sullivan, Issaquah, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 49 days.

(21) Appl. No.: 14/749,410

(22) Filed: Jun. 24, 2015

(65) Prior Publication Data

US 2016/0363771 A1    Dec. 15, 2016

Related U.S. Application Data

(60) Provisional application No. 62/174,359, filed on Jun. 11, 2015.

(51) Int. Cl.
*G02B 27/01* (2006.01)
*F16M 13/04* (2006.01)

(52) U.S. Cl.
CPC ......... *G02B 27/0176* (2013.01); *F16M 13/04* (2013.01)

(58) Field of Classification Search
CPC ............ G02B 27/017; G02B 27/20176; H04R 1/1066; H04R 5/023; H04R 5/033
See application file for complete search history.

(56) References Cited

U.S. PATENT DOCUMENTS

| | | | | |
|---|---|---|---|---|
| 5,551,089 | A | * 9/1996 | Whidden | A61F 11/14 128/866 |
| 2012/0105740 | A1 | * 5/2012 | Jannard | G02C 9/04 348/794 |

* cited by examiner

*Primary Examiner* — Kevin M Nguyen
(74) *Attorney, Agent, or Firm* — Morgan, Lewis & Bockius LLP

(57) ABSTRACT

A strap system for a head-mounted display is disclosed. The strap system includes a rigid segment and a latching subsystem coupled to the rigid segment. The rigid segment has opposite first and second sides. The rigid segment couples to the head-mounted display from the first side. The latching subsystem couples to the second side of the rigid segment. The latching subsystem includes a plate including a pair of slots to respectively receive a pair of posts protruding from a detachable audio system. The latching subsystem also includes a pair of latches to latch to grooves in the pair of posts. Each latch of the pair of latches includes an opening that overlaps a respective slot of the pair of slots. The opening receives a respective post of the pair of posts.

20 Claims, 8 Drawing Sheets

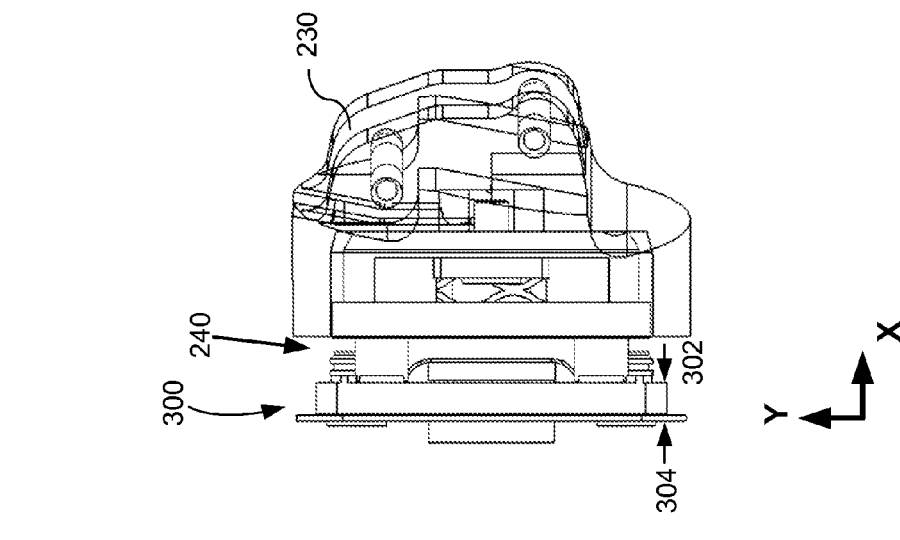
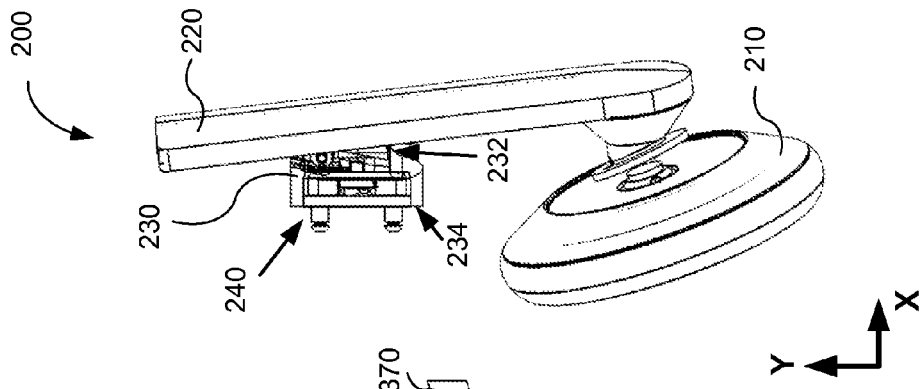
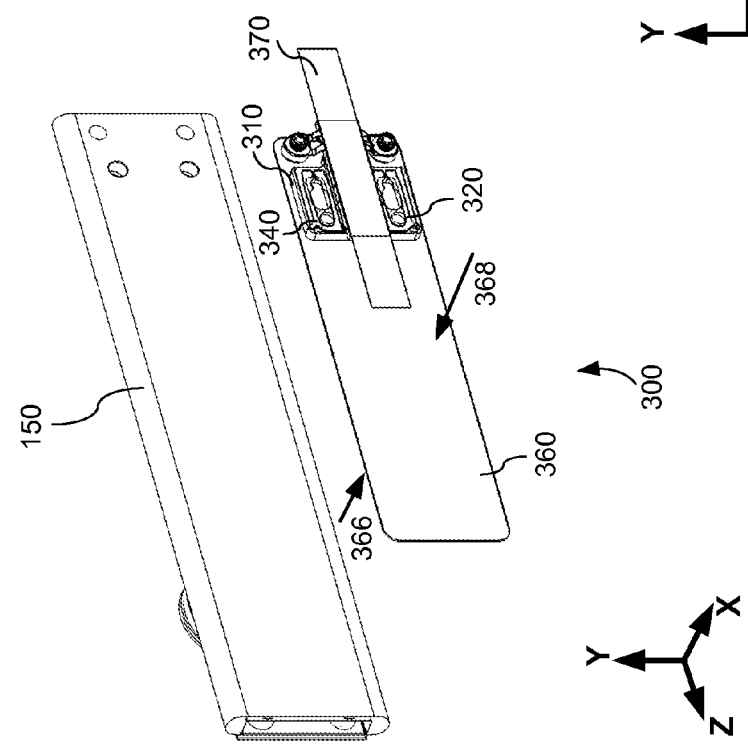

STRAP SYSTEM FOR HEAD-MOUNTED DISPLAYS

RELATED APPLICATIONS

This application claims priority to U.S. Provisional Patent Application Ser. No. 62/174,359, filed on Jun. 11, 2015, entitled "Strap System for Head-Mounted Displays," the disclosure of which is incorporated herein by reference in its entirety.

TECHNICAL FIELD

This application relates generally to wearable technology and virtual-reality technology, including but not limited to a strap system for a head-mounted display.

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

However, it may be difficult for a user to properly adjust and comfortably wear the head-mounted displays and the integrated audio systems using the existing technology, which may negatively affect the user's experience.

SUMMARY

In accordance with some embodiments, a strap system for a head-mounted display includes a rigid segment and a latching subsystem coupled to the rigid segment. The rigid segment has opposite first and second sides. The rigid segment couples to the head-mounted display from the first side. The latching subsystem couples to the second side of the rigid segment. The latching subsystem includes a plate including a pair of slots to respectively receive a pair of posts protruding from a detachable audio system. The latching subsystem also includes a pair of latches to latch to grooves in the pair of posts. Each latch of the pair of latches includes an opening that overlaps a respective slot of the pair of slots. The opening receives a respective post of the pair of posts.

In accordance with some embodiments, a head-mounted display system includes a head-mounted display, a strap system for mounting the head-mounted display on the user's head, and a detachable audio subsystem. The strap system includes a semi-rigid segment to conform to a portion of the user's head, and a rigid segment connected to the semi-rigid segment. The rigid segment includes a first side to couple to the head-mounted display and a second side opposite to the first side. The strap system also includes a latching subsystem coupled to the second side of the rigid segment. The detachable audio subsystem includes a speaker and a coupling subsystem including a pair of posts to couple to the latching subsystem. Each post of the pair of posts has a groove. The latching subsystem includes a plate including a pair of slots to respectively receive the pair of posts, and a pair of latches to latch to the grooves in the pair of posts. Each latch of the pair of latches includes an opening that overlaps a respective slot of the pair of slots. The opening receives a respective post of the pair of posts.

In accordance with some embodiments, a latching system for coupling an audio system to a head-mounted display includes a plate including a pair of slots to respectively receive a pair of posts protruding from the audio system, and a pair of latches to latch to grooves in the pair of posts. Each latch of the pair of latches includes an opening that overlaps a respective slot of the pair of slots. The opening receives a respective post of the pair of posts. Each latch of the pair of latches includes a pair of members and a serpentine spring. The pair of members join at a first end and are unconnected at a second end to define the opening. The serpentine spring is coupled to the first end of the pair of members.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIG. 3A is a perspective view of a strap system including a rigid segment and a latching subsystem in accordance with some embodiments.

FIG. 3B is a side view of a detachable audio subsystem for a head-mounted display system in accordance with some embodiments.

FIG. 3C is a side view of a latching subsystem coupled with a strap connector in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
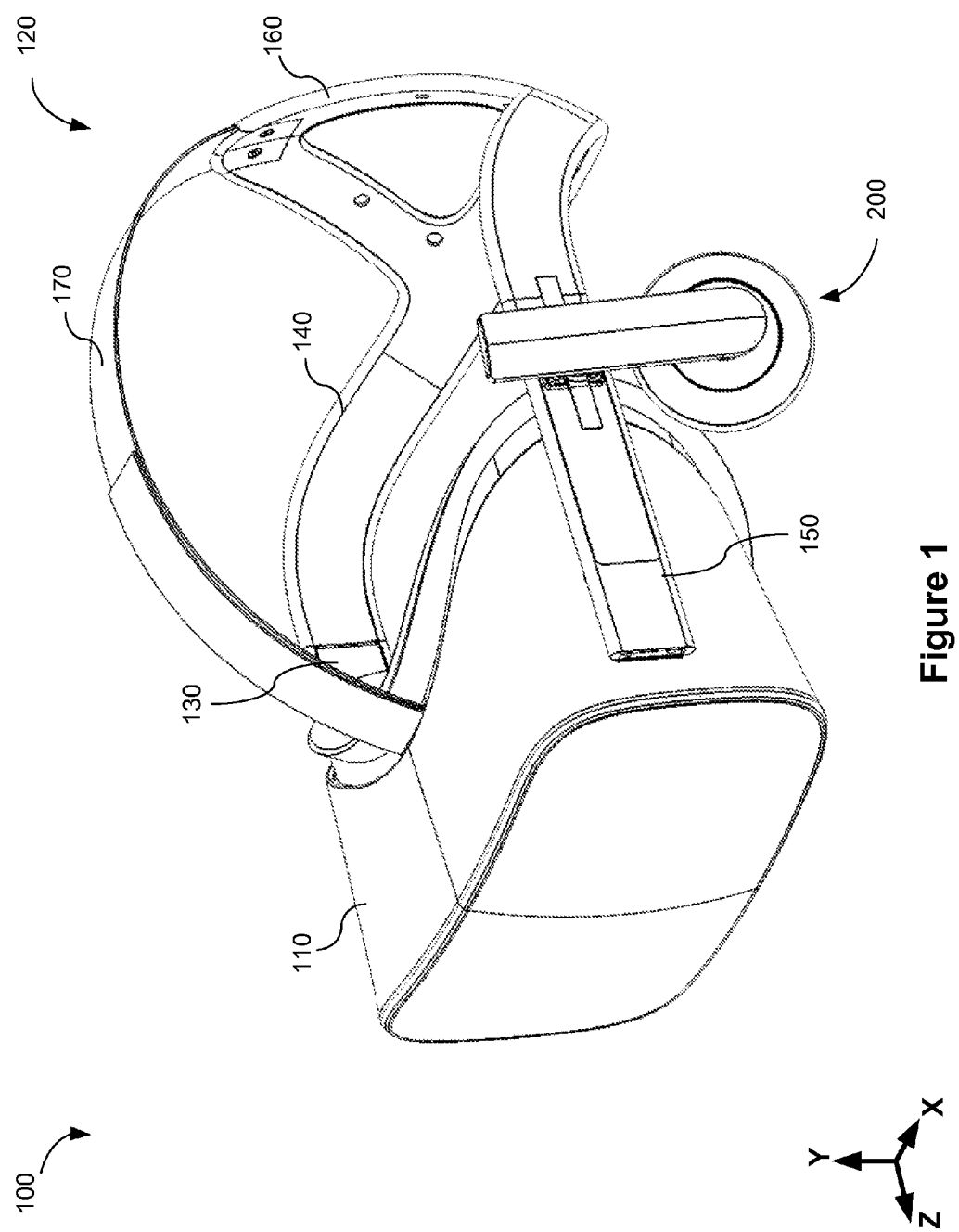
FIG. 1 is a perspective view of a head-mounted display system comprising a head-mounted display, a strap system, and a detachable audio subsystem in accordance with some embodiments.

FIG. 1 is a perspective view of a head-mounted display system 100 in accordance with some embodiments. In some embodiments, the head-mounted display system 100 comprises a head-mounted display 110, a strap system 120, and a detachable audio subsystem 200. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap system 120.

The strap system 120 is used for mounting the head-mounted display 110 on a user's head. In the example of FIG. 1, the strap 120 comprises a rigid segment 130, a semi-rigid segment 140, and a rigid segment 150 that are coupled to each other to adjustably wrap around side and back portions of the user's head.

In some embodiments, the strap 120 comprises a single and continuous semi-rigid segment 140 including two arc portions, and each arc portion is to extend from above a user's ears to below the user's occipital lobe to conform to a portion of the user's head. Alternatively, the strap 120 may comprise two separate and symmetric semi-rigid segments each including an arc portion.

In some embodiments, the rigid segments 130 and 150 are respectively connected to the semi-rigid segment 140. The rigid segments 130 and 150 are also respectively coupled to the head-mounted display 110 and positioned on respective sides of the user's head to extend along the lateral dimension (e.g., the Z dimension in FIG. 1). The strap 120 may further include flexible segments (not shown) that are stretchable within the rigid segments 130 and 150 respectively to adjust the strap 120 in accordance with the user's head.

In some embodiments, the strap 120 comprises a back piece 160 coupled with the semi-rigid segment 140 to rest against the back of the user's head (e.g., around the user's occipital lobe).

In some embodiments, the strap 120 comprises a top strap 170 coupled to the back piece 160 and the head-mounted display 110 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management, signal transmission, and/or other functionalities to the head-mounted display 110 and the detachable audio subsystem 200. For example, the head-mounted display 110 is integrated with the detachable audio subsystem 200 using suitable electrical connection mechanisms to provide both visual and audio virtual-reality experiences to the user.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Figure 2:
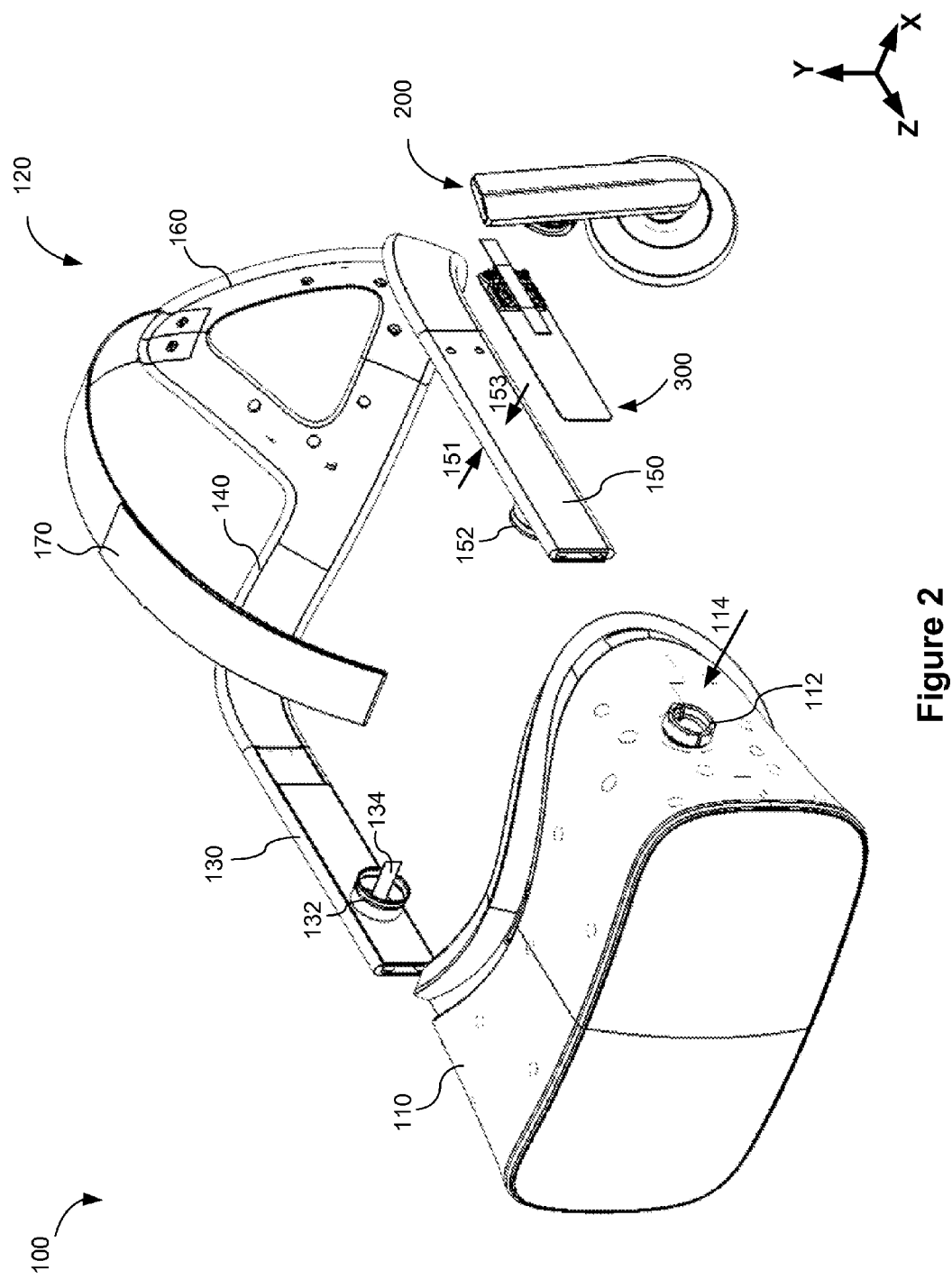
FIG. 2 is an exploded view illustrating components of a head-mounted display system in accordance with some embodiments.

FIG. 2 is an exploded view illustrating components of the head-mounted display system 100 in accordance with some embodiments. In some embodiments, the rigid segment 150 includes a side 151 opposite to a side 153 along the X dimension as shown in FIG. 2. The side 151 of the rigid segment 150 couples to the corresponding side of the head-mounted display 110 via a suitable coupling structure. For example, the rigid segment 150 includes a cylindrical structure 152 with a hollow center to accommodate a cylindrical structure 112 protruding from a side 114 of the head-mounted display 110. The cylindrical structure 152 further includes grooves to fasten to the side 114 of the head-mounted display 100. The detailed structure of the cylindrical structure 152 may be substantially symmetrical to a cylindrical structure 132 of the rigid segment 130 as shown in FIG. 2. The rigid segment 130 also includes flat circuit 134 to couple to the head-mounted display 110. The side 153 of the rigid segment 150 is coupled to a latching subsystem 300.

FIG. 3A is a perspective view of the rigid segment 150 and the latching subsystem 300 in accordance with some embodiments. The latching subsystem 300 includes a plate 310, a pair of latches 320 and 340 disposed over the plate 310, a base 360 underlying the plate 310, and a cover 370 to cover serpentine springs of the pair of latches 320 and 340. The structures of the respective components of the latching subsystem 300 are further discussed in details with reference to FIGS. 4A-4H.

FIG. 3B is a side view of the detachable audio subsystem 200 for a head-mounted display system in accordance with some embodiments. The detachable audio subsystem 200 comprises a speaker 210, an arm 220 coupled to the speaker 210, a strap connector 230 coupled to the arm 220, and a coupling subsystem 240 coupled to the strap connector 230. The coupling subsystem 240 is releasably coupled to the strap 120 (e.g., the rigid segment 150) for the head-mounted display system 100 as illustrated in FIGS. 1-2.

The speaker 210 may be an on-ear headphone speaker, an around-ear headphone speaker, an over-ear headphone speaker, an in-ear headphone speaker, an earbud speaker, or any other suitable style of speaker.

As shown in FIG. 3B, the strap connector 230 and the speaker 210 are coupled to the arm 220 in respective portions distributed along the length (e.g., the Y dimension) of the arm 220. The arm 220 may further comprise a four-bar linkage to provide inward and outward movement of the speaker with respect to the user's ear. Various embodiments of the four-bar linkage and other possible structures of the arm 220 are described in U.S. patent application Ser. No. 14/627,639, filed on Feb. 20, 2015, the disclosure of which is incorporated herein by reference in its entirety.

The strap connector 230 includes a side 232 coupled to the arm 220 and a side 234 coupled to the coupling subsystem 240, and the side 232 and the side 234 are opposite to each other along the X dimension as illustrated in FIG. 3B. Various embodiments of the strap connector 230 are described in U.S. patent application Ser. No. 14/627,639.

FIG. 3C is a side view of the latching subsystem 300 coupled with the strap connector 230 via the coupling subsystem 240 in accordance with some embodiments. The latching subsystem 300 includes a side 302 coupled to the coupling subsystem 240 and a side 304 to couple to the strap 120 (e.g., the rigid segment 150 of FIGS. 1-2). The side 302 and the side 304 are opposite to each other along the X dimension as illustrated in FIG. 3C.

In some embodiments, the latching subsystem 300 is a component of the strap 120 (e.g., the rigid segment 150) that is fixedly connected to the strap 120. Alternatively, the latching subsystem 300 is coupled to the strap 120 using any suitable structure; once coupled, the latching subsystem 300 may be considered part of the strap 120.

Figure 3D:
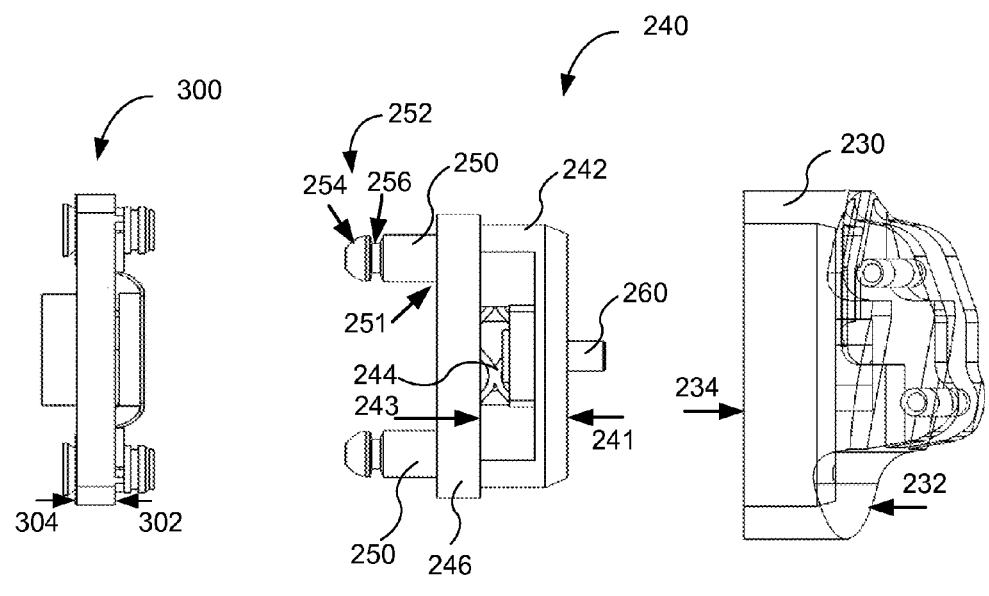
FIG. 3D is a side view of a latching subsystem, a coupling subsystem, and a strap connector in accordance with some embodiments.

FIG. 3D is a side view of the latching subsystem 300, the coupling subsystem 240, and the strap connector 230 in accordance with some embodiments. The coupling subsystem 240 includes a base 242, one or more posts 250 (e.g., a pair of posts) extending from the base 242 and through a spacer 246 to couple to the latching subsystem 300, and a spring 244 positioned between the base 242 and the spacer 246 to deform (e.g., to release from a compressed length to or toward a natural length) to detach the coupling subsystem 240 from the latching subsystem 300 when the posts 250 decouple from the latching subsystem 300. Opposite ends of the spring 244 contact the spacer 246 and the base 242. One or more coupling elements 260 (e.g., screws) are used to couple the coupling subsystem 240 to the strap connector 230.

In some embodiments, the base 242 is a circular boss. The base 242 includes a side 241 engaged with the side 234 of the strap connector 230 and a side 243 opposite to the side 241. The posts 250 extend from the side 243 of the base 242 to insert into the latching subsystem 300.

In some embodiments, the spring 244 contacts the side 243 of the base 240, to detach the detachable audio system 240 from the latching subsystem 300 when the pair of posts 250 decouple from the latching subsystem 300 (e.g., from a pair of latches as discussed in FIGS. 4A-4H).

In some embodiments, each post 250 includes an end 251 inserted into a respective opening (not shown) in the base 242. Each post 250 also includes an end 252 opposite to the end 251 to couple to the latching subsystem 300. The end 252 includes a tip 254 to be inserted into an opening of the latching subsystem 300. The end 252 also includes a groove 256 to engage with concave edges of a latch in the latching subsystem 300.

Figure 3E:
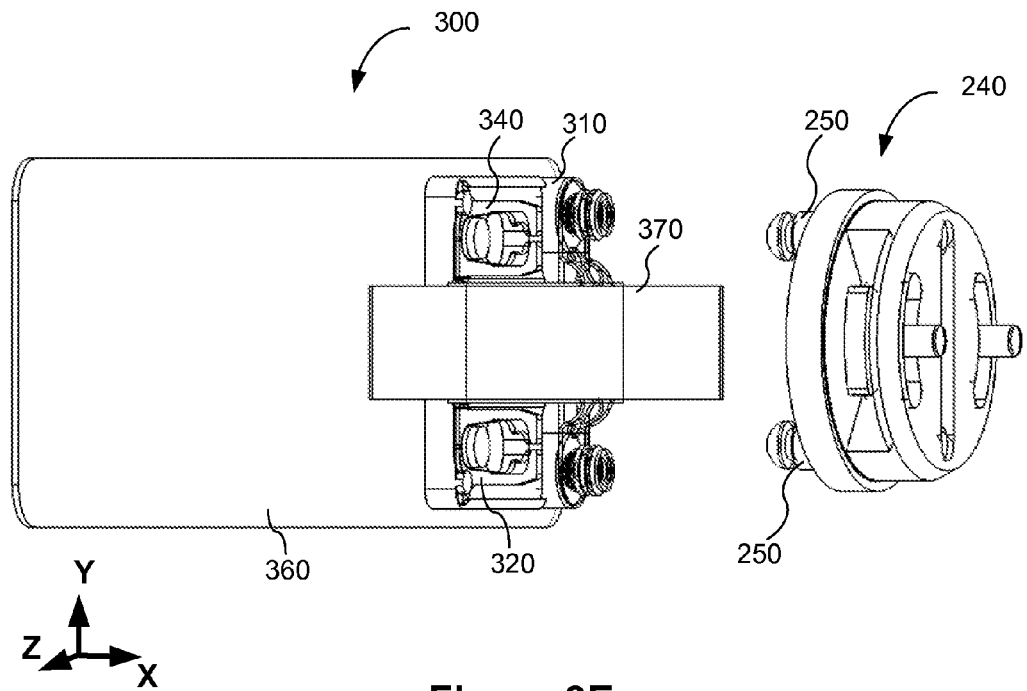
FIG. 3E is a perspective view of a latching subsystem to couple with a coupling subsystem in accordance with some embodiments.

FIG. 3E is a perspective view of the latching subsystem 300 to couple with the coupling subsystem 240 in accordance with some embodiments. As shown in FIG. 3E, the pair of posts 250 insert into respective openings of the pair of latches 320 and 340 to couple the coupling subsystem 240 to the latching subsystem 300. The concave edges of the latches 320 and 340 respectively latch to the grooves of the pair of the posts 250. Various embodiments of the coupling subsystem 240 are described in U.S. Patent Application No. 62/174,298, filed on Jun. 11, 2015, the disclosure of which is incorporated herein by reference in its entirety.

Figure 4A:
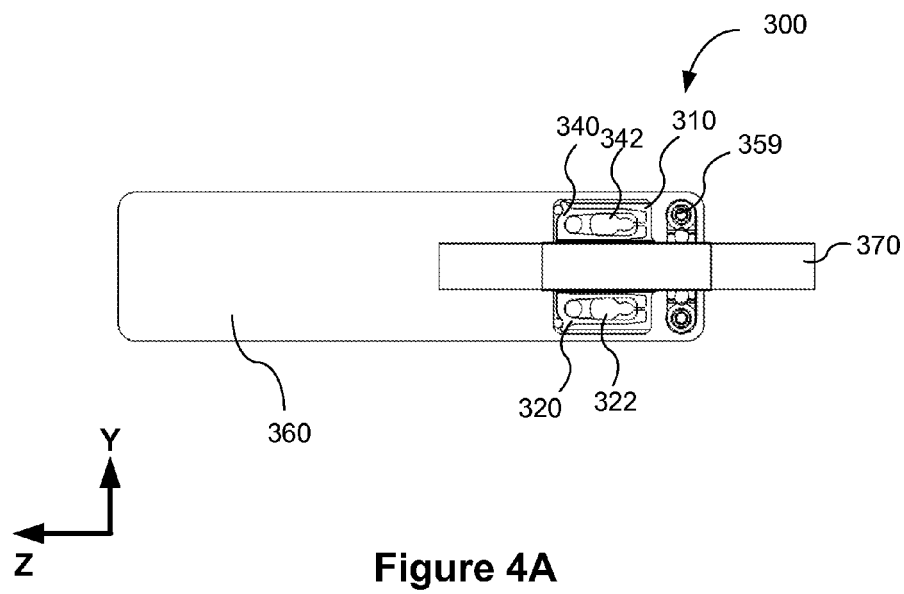
FIGS. 4A-4B are top views of a latching subsystem and its components in accordance with some embodiments.
Figure 4B:
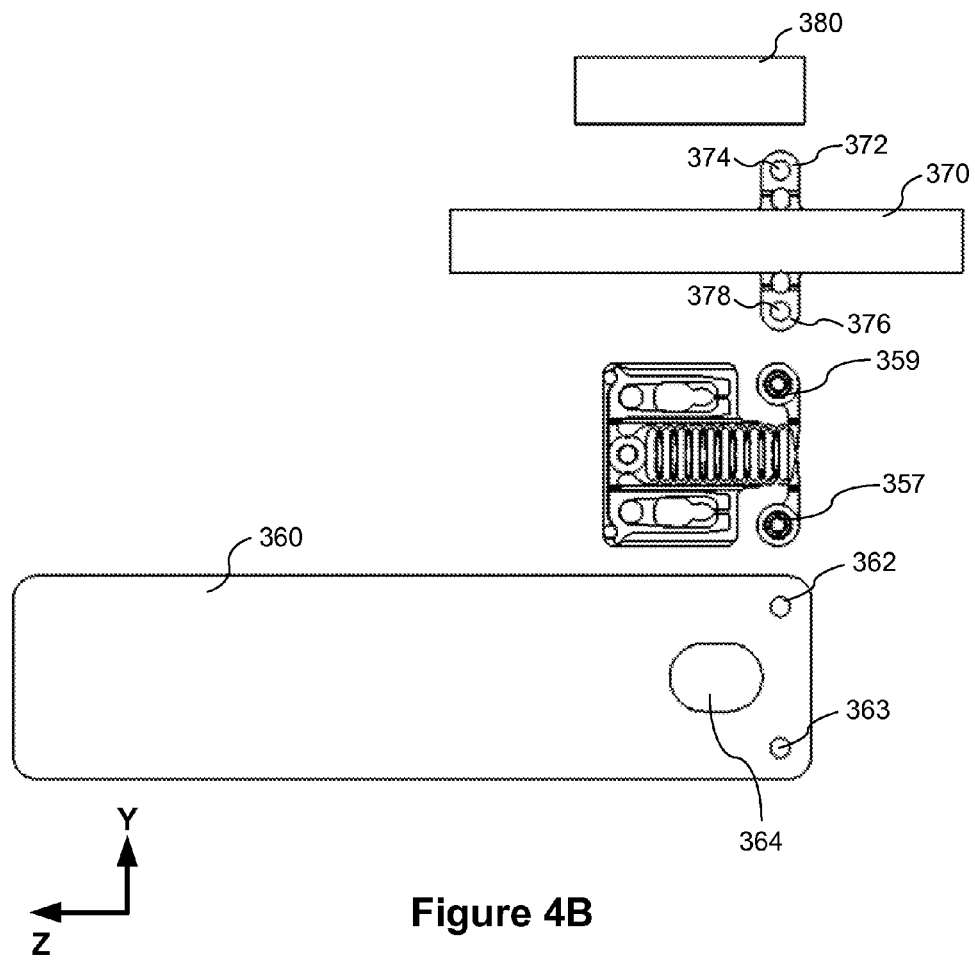
Figure 4C:
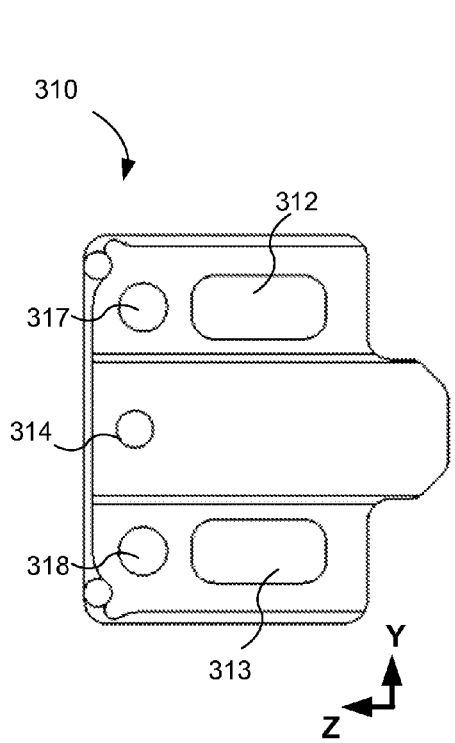
FIG. 4C is a top view of a plate of a latching subsystem in accordance with some embodiments.
Figure 4D:
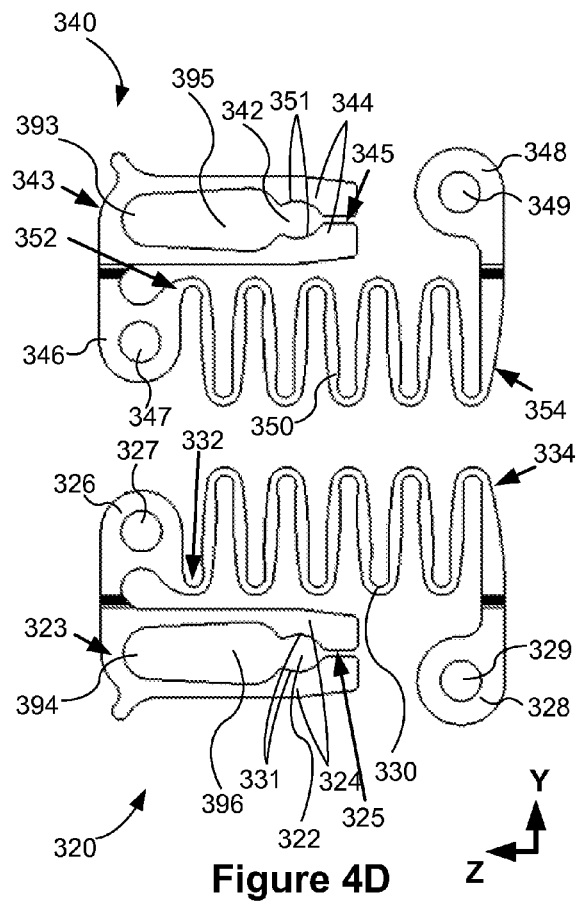
FIG. 4D is a top view of a pair of latches of a latching subsystem in accordance with some embodiments.
Figure 4E:
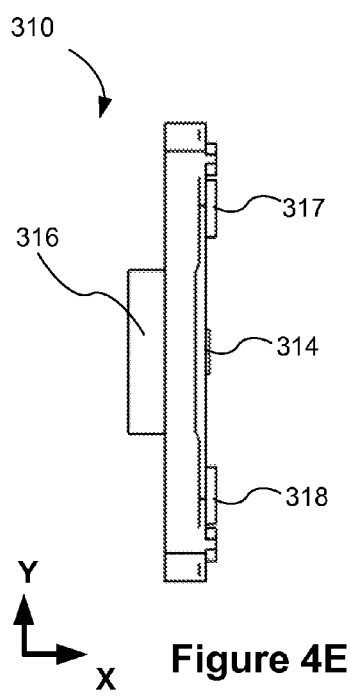
FIG. 4E is a side view of a plate of a latching subsystem in accordance with some embodiments.
Figure 4F:
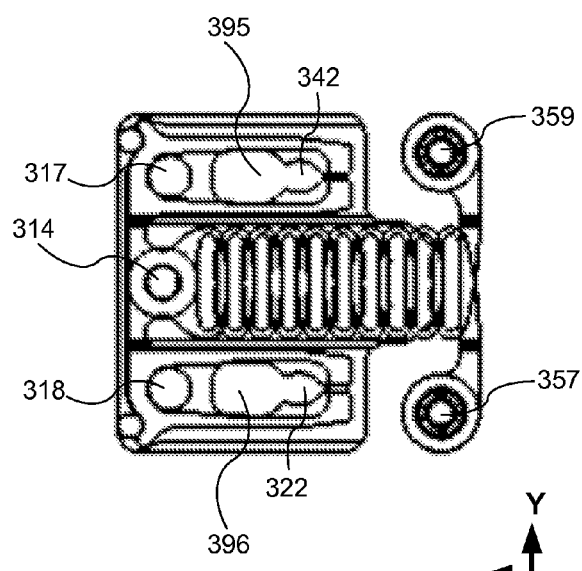
FIG. 4F is a top view of a plate coupled with a pair of latches of a latching subsystem in accordance with some embodiments.
Figure 4G:
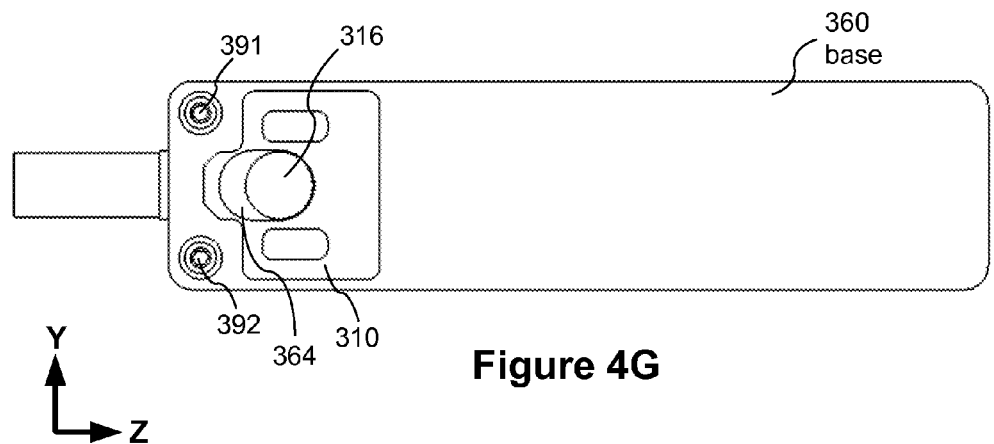
FIG. 4G is a bottom view of a latching subsystem in accordance with some embodiments.
Figure 4H:
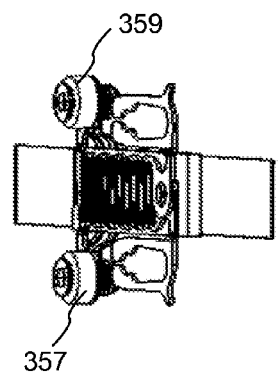
FIG. 4H is a perspective view of components of a latching subsystem in accordance with some embodiments.
Figure 4H:
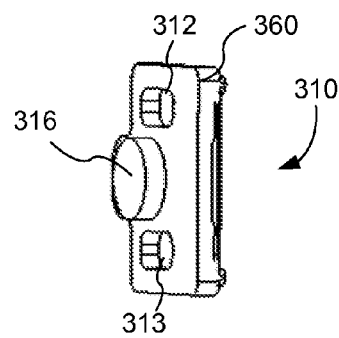
Figure 4H:
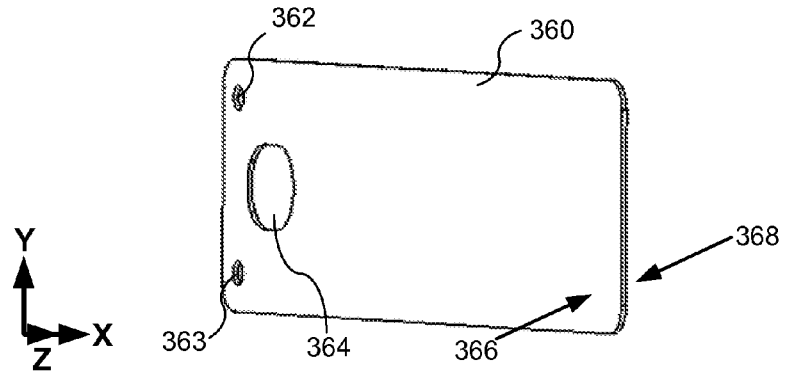

FIGS. 4A-4H are views of the latching subsystem 300 from different angles in accordance with some embodiments. As illustrated in FIGS. 4C and 4E, the plate 310 includes a pair of slots 312 and 313 to respectively receive the pair of posts 250 protruding from the detachable audio system 200 (e.g., the coupling subsystem 240). The plate 310 also includes a protrusion 314 protruding from the top surface of the plate 310 to be used for coupling the plate 310 with the pair of latches 320 and 340. The plate 310 further include a pair of protrusions 317 and 318 separate from the protrusion 314 and located next to the ends of the slots 312 and 313 as shown in FIGS. 4C-4D. The protrusions 317 and 318 respectively correspond to end portions 393 and 394 of apertures 395 and 396, and the apertures 395 and 396 are connected to the openings 342 and 322 respectively. When the pair of latches 320 and 340 are coupled to the plate 310 as shown in FIG. 4F, the protrusions 317 and 318 respectively extend through the end portions 393 and 394 on the latches 340 and 320, and the protrusion 314 extends through the aperture 347 of the latch 340 and the aperture 327 of the latch 320 to define the positions of the latches 320 and 340 relative to the plate 310 as shown in FIG. 4F. The apertures 395 and 396 overlap the slots 312 and 313 on the plate 310 respectively. As illustrated in FIGS. 4E and 4G, a projection 316 protrudes from the back of the plate 310 to couple to a slot on the base 360.

In some embodiments, the latch 320 is identical to the latch 340 or a mirror image of the latch 340. The latch 340 includes a pair of members 344 joined at an end 343 and unconnected at an end 345. The members 344 define an opening 342 to receive the post 250. For example as shown in FIG. 4D, each member 344 of the pair of members includes a concave edge portion 351 and the concave edge portions 351 face each other to define the opening 342.

Similarly, the latch 320 includes a pair of members 324 joined at an end 323 and unconnected at an end 325. The members 324 define an opening 322 to receive the post 250. For example as shown in FIG. 4D, each member 324 of the pair of members includes a concave edge portion 331 and the concave edge portions 331 face each other to define the opening 322.

In some embodiments, the openings 342 and 322 narrow at a neck that forms the end of the concave edge portions and then widen again (e.g., to a width equal to or greater than the width of the slots 312 and 313). As shown in FIG. 4D, the widened portions extend to form the apertures 395 and 396, and the end portions 393 and 394 of the apertures 395 and 396 receive the protrusions 317 and 318 from the plate 310. In some embodiments, the width (e.g., maximum width) of the apertures 395 and 396 are equal to or greater than the tips 254 of the posts 250.

In some embodiments, the latch 340 includes a serpentine spring 350 coupled to the pair of members 344. For example, the serpentine spring 350 is disposed next to the pair of members 344 such that at least a portion of the serpentine spring 350 is parallel to the length of the pair of members 344 as shown in FIG. 4D. Similarly, the latch 320 also includes a serpentine spring 330 coupled to the pair of members 324 to adjust a size of the opening 322 when deformed. The serpentine spring 330 may be disposed next to the pair of members 324 such that at least a portion of the serpentine spring 330 is parallel to the length of the pair of members 324.

In some embodiments when the latches 320 and 340 are in initial states (e.g., relaxed states), the widths of the openings 342 and 322 are respectively narrower than the groove diameters of the posts 250. When the tips 254 are inserted into corresponding openings 342 and 322, the openings 342 and 322 widen to accept the posts 250 and the edges 351 and 331 latch onto the grooves 256 of the pair of posts 250.

In some embodiments, the latch 340 includes a portion 346 coupled between the end 343 of the pair of members 344 and an end 352 of the serpentine spring 350. The portion 346 includes an aperture 347. Similarly, the latch 320 includes a portion 326 coupled between the end 323 of the pair of members 324 and an end 332 of the serpentine spring 330. The portion 326 includes an aperture 327.

In some embodiments, the latches 320 and 340 are disposed over the plate 310 and coupled to the plate 310 such that the serpentine springs 330 and 350 overlap each other. Additionally, the opening 342 of the latch 340 overlaps the slot 312 of the plate 310, and the opening 322 of the latch 320 overlaps the slot 313 of the plate 310.

In some embodiments, the base 360 is elongated. As shown in FIG. 3A, the plate 310 and the pair of latches 320 and 340 are coupled to the base 360 over a surface 368 of the base 360. The rigid segment 150 is coupled to the base 360 over a surface 366 of the base 360 opposite to the surface 368.

In some embodiments, the cover 370 is elongated. The cover 370 is coupled to the base 360 and the pair of latches 320 and 340 to cover the overlapped serpentine springs 330 and 350. The spacer 380 is located between the cover 370 and the pair of latches 320 and 340 to cover the overlapped serpentine springs 330 and 350.

In some embodiments, the cover 370 includes a pair of projections 372 and 376 opposite to each other as shown in FIG. 4B. The projection 372 includes an aperture 374 and the projection 376 includes an aperture 378.

In some embodiments as shown in FIG. 4D, the latch 340 further includes a portion 348 coupled to an end 354 of the serpentine spring 350 opposite to the end 352. The portion 348 includes an aperture 349. Similarly, the latch 320 further includes a portion 328 coupled to an end 334 of the serpentine spring 330 opposite to the end 332. The portion 328 includes an aperture 329.

As shown in FIG. 4B, the base 360 includes a pair of apertures 362 and 363. A pair of connectors 391 and 392 (e.g., bolts, screws, fasteners), shown in FIG. 4G, are used to couple the cover 370, the pair of latches 320 and 340, and the base 360 together. For example, from the bottom surface of the base 360, the connector 391 inserts through the aperture 362 of the base 360, the aperture 349 of the latch 340, and the aperture 374 of the cover 370. The connector 392 inserts through the aperture 363 of the base 360, the aperture 329 of the latch 320, and the aperture 378 of the cover 370. In some embodiments, a pair of nuts 359 and 357 respectively fasten the pair of connectors 391 and 392 from the top surface of the base 360.

In some embodiments as shown in FIGS. 4B and 4G, the base 360 further includes a slot 364 (e.g., an oval slot) and the base 360 is coupled to the plate 310 by inserting the projection 316 of the plate 310 through the slot 364.

Referring to FIGS. 4C-4F and 3E, when the detachable audio subsystem 200 are coupled to the strap 120, the tips 254 of a pair of posts 250 protruding from the coupling structure 240 are inserted into the openings 342 and 322. The posts 250 are forced into the openings 342 and 322 to trigger widening of the members 344 and 324 until the concave edges 351 and 331 latch to the grooves 256 of the posts 250. As the members 344 and 324 widen, the portions 346 and 326 may pivot along the protrusions 317 and 318 which extend through the apertures 347 and 327. The pivoting motions can be further transferred to the serpentine springs 350 and 330 to deform the serpentine springs 350 and 330 linearly along the Z dimension.

In order to decouple the detachable audio subsystem 200 from the strap 120, the user can slide the detachable audio subsystem 200 along the Z dimension to slide the posts 250 from the openings 342 and 322 towards the wider apertures 395 and 396. As the audio subsystem 200 slides, the grooves 256 of the posts 250 force the members 344 and 324 to widen. When the posts 250 slide into the apertures 395 and 396, because the width of the apertures 395 and 396 are equal to or greater than the tips 254 of the posts 250, the posts 250 can be pulled out from the apertures 395 and 396 freely to decouple the detachable audio subsystem 200 from the strap 120.

Figure 5A:
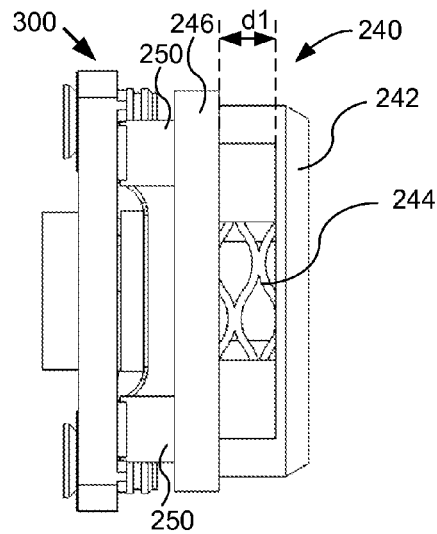
FIGS. 5A-5C are side views illustrating decoupling mechanisms between a coupling subsystem and a latching subsystem in accordance with some embodiments.
Figure 5B:
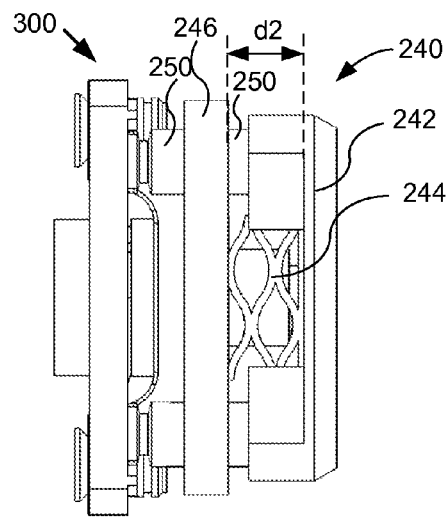
Figure 5C:
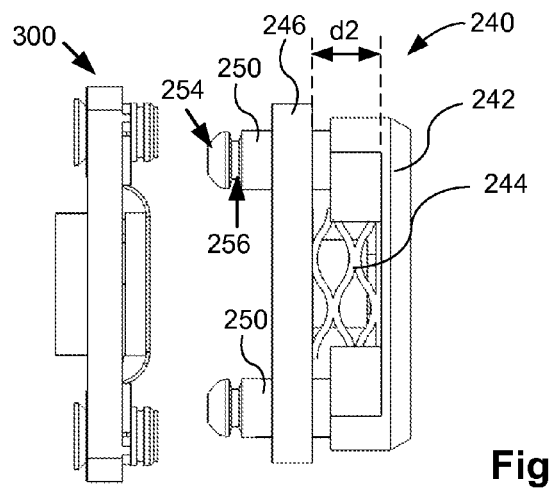

FIGS. 5A-5C are side views illustrating decoupling mechanisms between the coupling subsystem 240 and the latching subsystem 300 in accordance with some embodiments. When the user decouples the audio subsystem 200 from the strap system 120, the posts 250 slide from the openings 342 and 322 to the apertures 395 and 396 as discussed in FIGS. 4C-4F to release the posts 250 from the latching subsystem 300. As the posts 250 are released, the spring 244 of the coupling subsystem 240 deforms from a first state at a length of d1 (e.g., FIG. 5A) to a second state at a length of d2 (e.g., FIG. 5B), where d2 is greater than d1, such that the coupling subsystem 240 automatically detaches from the latching subsystem 300.

For example, when the posts 250 slide into the apertures 395 and 396, the spring 244 automatically releases from a compressed state at the length d1 to a greater length d2. Simultaneously, the base 242 moves along X dimension away from the spacer 246, thereby removing the posts 250 away from the latching system 300 to decouple the coupling subsystem 240 from the latching subsystem 300. The length d2 can be a natural length (i.e., unstretched and uncompressed) of the spring 244, or a length longer than the compressed length d1 and shorter than the natural length of the spring 244.

Reversibly, the coupling subsystem 240 can couple to the latching subsystem 300 by pressing the tips of the posts 250 into the openings 342 and 322 of the latches 340 and 320. The openings 342 and 322 are widened to accommodate the tips of the posts 250 until the concave edges 351 and 331 latch to the grooves 256 of the posts 250. During this coupling process, the spring 244 is compressed from the length d2 to the length d1, and the base 242 gets in contact with the spacer 246.

In some embodiments, the coupling subsystem 240 and the latching subsystem 300 comprise suitable electrical connection mechanism(s) to provide power management and/or signal transmission between the speaker 210 and the head-mounted display 110. For example, after the posts 250 are inserted and latched to the openings 342 and 322 of the latches 340 and 320, the tips 254 of the posts 250 may contact the base 360 and transmit electric signals from/to the base 360. The base 360 is further electrically connected to the strap 120 (e.g., the rigid segment 150) of the head-mounted display system 100.

In some embodiments, the one or more components of the latching subsystem 300 are made of materials such as stainless steel, acetal copolymer, other polymers and other metals.

Combined with the coupling subsystem 240, the latching subsystem 300 can be used for attaching the speaker 210 to the strap 120, and detaching the speaker 210 from the strap 120 of the head-mounted display 110. The latching subsystem 300 and the coupling subsystem 240 enable the speaker 210 to be removed from the user's ear without taking off the strap 120 and head-mounted display 110.

In some embodiments, the audio subsystem 200 offers multiple degrees of freedom to adjust the position of the speaker 210 to fit different users. The adjustments with multiple degrees of freedom include, but are not limited to, pivoting inward and outward relative to the user's ear, rotating within a vertical plane, and sliding upward and downward to adjust the height of the speaker 210. Various embodiments of the multiple degrees of freedom and related structures are described in U.S. patent application Ser. No. 14/627,639.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A strap system for a head-mounted display, the strap system comprising:
   a rigid segment, having opposite first and second sides, to couple to the head-mounted display from the first side; and
   a latching subsystem coupled to the second side of the rigid segment, the latching subsystem comprising:
      a plate including a pair of slots to respectively receive a pair of posts protruding from a detachable audio system; and
      a pair of latches to latch to grooves in the pair of posts, each latch of the pair of latches including an opening that overlaps a respective slot of the pair of slots, the opening to receive a respective post of the pair of posts.

2. The strap system of claim 1, wherein each latch of the pair of latches comprises:
   a pair of members joined at a first end and unconnected at a second end, to define the opening; and
   a serpentine spring coupled to the first end of the pair of members.

3. The strap system of claim 2, wherein the openings are configured to widen to release the pair of posts to detach the detachable audio system from the strap system.

4. The strap system of claim 2, wherein:
   each member of the pair of members includes a concave edge portion facing the other member of the pair of members; and
   the concave edge portions of the pair of members define the opening.

5. The strap system of claim 4, wherein the pair of latches are coupled to the plate such that the serpentine springs overlap each other.

6. The strap system of claim 5, wherein:
   each latch of the pair of latches comprises a first portion coupled between the first end of the members and a first end of the serpentine spring and having a first aperture;
   the plate comprises a protrusion corresponding to the first aperture of both latches of the pair of latches; and
   the protrusion of the plate extends through the first aperture of each latch of the pair of latches to couple the plate to the pair of latches.

7. The strap system of claim 6, further comprising an elongated base, wherein the plate and the pair of latches are coupled to the elongated base over a first surface of the elongated base, and the rigid segment is coupled to the elongated base over a second surface of the elongated base opposite to the first surface.

8. The strap system of claim 7, further comprising an elongated cover, coupled to the elongated base and the pair of latches, to cover the serpentine springs.

9. The strap system of claim 8, further comprising a spacer located between the elongated cover and the pair of latches.

10. The strap system of claim 8, wherein:
    the elongated cover includes a pair of projections opposite to each other, each projection having an aperture;
    each latch of the pair of latches further comprises a second portion coupled to a second end of the serpentine spring opposite to the first end of the serpentine spring, the second portion of the latch having a second aperture;
    the elongated base includes a pair of apertures; and
    a pair of connectors couple the elongated cover, the pair of latches, and the elongated base through the apertures of the pair of projections, the pair of apertures of the elongated base, and the second apertures.

11. The strap system of claim 5, wherein, for each latch of the pair of latches:
    the opening narrows at a neck that forms an end of the concave edge portions; and
    the neck widens again to an aperture with a width equal to or greater than a diameter of the posts.

12. A head-mounted display system comprising:
    a head-mounted display;
    a strap system for mounting the head-mounted display on the user's head, the strap system comprising:
       a semi-rigid segment to conform to a portion of the user's head;
       a rigid segment connected to the semi-rigid segment and including a first side to couple to the head-mounted display and a second side opposite to the first side; and
       a latching subsystem coupled to the second side of the rigid segment; and
    a detachable audio subsystem including a speaker and a coupling subsystem including a pair of posts to couple to the latching subsystem, each post of the pair of posts having a groove,
    wherein the latching subsystem comprises:
       a plate including a pair of slots to respectively receive the pair of posts; and
       a pair of latches to latch to the grooves in the pair of posts, each latch of the pair of latches including an opening that overlaps a respective slot of the pair of slots, the opening to receive a respective post of the pair of posts.

13. The head-mounted display system of claim 12, wherein each latch of the pair of latches comprises:
    a pair of members joined at a first end and unconnected at a second end, to define the opening; and a serpentine spring coupled to the first end of the pair of members.

14. The head-mounted display system of claim 13, wherein the pair of latches are coupled to the plate such that the serpentine springs overlap each other.

15. The head-mounted display system of claim 14, wherein:
   each latch of the pair of latches comprises a first portion coupled between the first end of the members and a first end of the serpentine spring and having a first aperture;
   the plate comprises a protrusion corresponding to the first aperture of both latches of the pair of latches; and
   the protrusion of the plate extends through the first aperture of each latch of the pair of latches to couple the plate to the pair of latches.

16. The head-mounted display system of claim 13, wherein:
   each member of the pair of members includes a concave edge portion facing the other member of the pair of members;
   the concave edge portions of the pair of members define the opening; and
   the openings are configured to widen to release the pair of posts to detach the detachable audio system from the strap system.

17. The head-mounted display system of claim 16, for each latch of the pair of the latches, wherein:
   the opening narrow at a neck that forms the end of the concave edge portions; and
   the neck widens again to an aperture with a width equal to or greater than a diameter of the posts.

18. The head-mounted display system of claim 12, wherein the detachable audio subsystem further comprises:
   an arm coupled to the speaker; and
   a strap connector including a first side coupled to the arm and a second side opposite to the first side,
   wherein the coupling subsystem is coupled to the second side of the strap connector, the coupling subsystem comprising:
      a base including a first side engaged with the second side of the strap connector and a second side opposite to the first side, the pair of posts extending from the second side of the base to insert into the pair of latches; and
      a spring, contacting the second side of the base, to detach the detachable audio system from the latching subsystem when the pair of posts decouple from the pair of latches.

19. The head-mounted display system of claim 18, wherein each post of the pair of posts comprises:
   a first end inserted into a respective opening of a plurality of openings in the base, and
   a second end to couple to the latching subsystem, the second end comprising:
      a tip to be inserted into the opening of the latch; and
      the groove.

20. A latching system for coupling an audio system to a head-mounted display, the latching system comprising:
   a plate including a pair of slots to respectively receive a pair of posts protruding from the audio system; and
   a pair of latches to latch to grooves in the pair of posts, each latch of the pair of latches including an opening that overlaps a respective slot of the pair of slots, the opening to receive a respective post of the pair of posts,
   wherein each latch of the pair of latches includes:
      a pair of members joined at a first end and unconnected at a second end, to define the opening; and
      a serpentine spring coupled to the first end of the pair of members.

* * * * *